United States Patent [19]

Kim

[11] Patent Number: 4,946,148
[45] Date of Patent: Aug. 7, 1990

[54] LEAF SPRING FOR SUPPORTING REELS OF A VIDEO TAPE CASSETTE

[75] Inventor: In J. Kim, Seoul, Rep. of Korea
[73] Assignee: Goldstar Co., Ltd., Seoul, Rep. of Korea
[21] Appl. No.: 397,966
[22] Filed: Aug. 24, 1989
[51] Int. Cl.⁵ .............................................. G11B 23/08
[52] U.S. Cl. ............................... 267/158; 360/130.33
[58] Field of Search .................. 267/36.1, 42, 48, 158, 267/159, 160, 164; 360/130.33, 132

[56] References Cited
U.S. PATENT DOCUMENTS 3,254,884  6/1966  Long et al. ........................... 267/158
4,293,885 10/1981  Shirako et al. ................. 360/130.33
4,314,299  2/1982  Ishida et al. .................... 360/130.33

Primary Examiner—Duane A. Reger
Attorney, Agent, or Firm—Birch, Stewart, Kolasch & Birch

[57] ABSTRACT

A leaf spring for supporting supply and take-up reels of a video tape cassette which has a narrow and uniform width on the whole while having a proper tensional force suitable for supporting the reels, whereby the leaf spring prevents a tape from badly travelling by maintaining the rotational centers of reels uniform without rolling thereof and reduces waste pieces from cutting materials.

3 Claims, 2 Drawing Sheets

LEAF SPRING FOR SUPPORTING REELS OF A VIDEO TAPE CASSETTE

BACKGROUND OF THE INVENTION

1. Field of the Invention

The present invention relates to a leaf spring for supporting supply and take-up reels of a video tape cassette and more particularly, to a leaf spring which is able to maintain the rotational center of supply and take-up reels uniform so as to obtain the smooth rotation of reels.

2. Description of the Prior Art

In a conventional tape cassette as shown in FIGS. 1 and 2, a supply reel 3 and a take-up reel 4 are rotatably mounted within upper and lower housings 1 and 2, and the supply and take-up reels 3 and 4 are guided by guide ribs 5 and 6 provided in the lower housing 2. The reels 3 and 4 are also resiliently pressed on pointed upper ends 7 and 8 thereof by both ends of a leaf spring 9 which is fixed on the lower surface of the upper housing 1. Therefore, the tape cassette is loaded on a video tape cassette recorder, the reels 3 and 4 can be rotated upon the rotation of supply and take-up reel tables (not shown).

In such conventional tape cassette, since the leaf spring 9 is adapted to merely press resiliently the pointed upper ends 7 and 8 of the reels 3 and 4 with both ends thereof, there are many problems, for example, the reels 3 and 4 are rolled arbitrarily when the tape is travelling, as much as a gap between the edges of frames of the reels and the guide ribs 5 and 6 so that a friction occurs therebetween, thereby giving rise to a bad travelling of the tape.

Furthermore, the gap between the supply reel 3 and the guide rib 5 disposed on the supply side is different from the gap between the take-up reel 4 and the guide rib 6 on the take-up side. Therefore, the condition of the tape travelling becomes worse. Also, since the leaf spring has an arcuate lozenge shaped configuration with a wide portion at the center thereof and both ends thereof becoming gradually narrower so as to provide a proper tensional force as shown in FIG. 2. Therefore, in manufacturing, a large amount of waste pieces are inevitably produced from cutting materials so that the productivity becomes low and the cost becomes high.

SUMMARY OF THE INVENTION

Accordingly, it is an object of the present invention to provide a leaf spring for supporting supply and take-up reels of a video tape cassette.

Another object of the present invention is to provide a leaf spring which prevents a tape from badly travelling by maintaining the rotational centers of reels uniform without rolling thereof.

A further object of the present invention is to provide a leaf spring which has a narrow and uniform width on the whole while having a proper tensional force suitable for supporting the reels so as to reduce waste pieces from cutting materials.

Still another object of the present invention is to provide a leaf spring for supporting reels which is provided with end of both sides thereof embossed upwardly so as to be formed pivoting protrusions for receiving pointed upper ends of the reels and center and mid-portions thereof are embossed upwardly and downwardly to supplement the tensional force so that an appropriate tensional force can be exhibited.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a leaf spring for supporting supply and take-up reels of a video tape cassette which has a narrow and uniform width on the whole while having a proper tensional force suitable for supporting the reels, whereby the leaf spring prevents a tape from badly travelling by maintaining the rotational centers of reels uniform without rolling thereof and reduces waste pieces from cutting materials.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
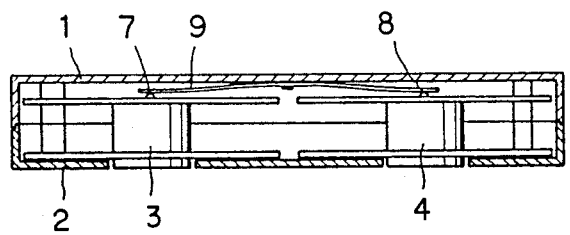
FIG. 1 is a sectional view of a conventional video tape cassette including a conventional leaf spring.
Figure 2:
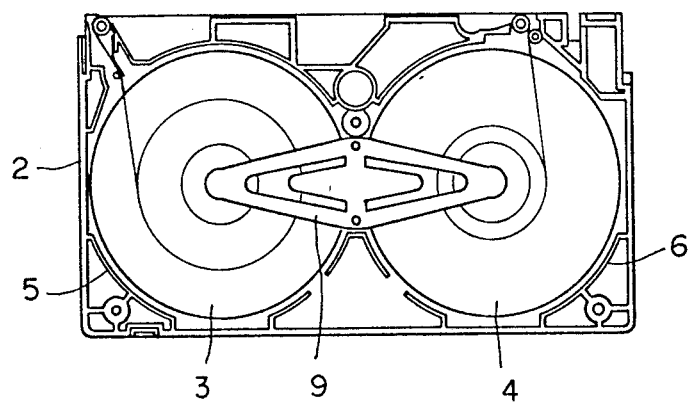
FIG. 2 is a plan view of FIG. 1 showing upper plate removed from the tape cassette.
Figure 3:
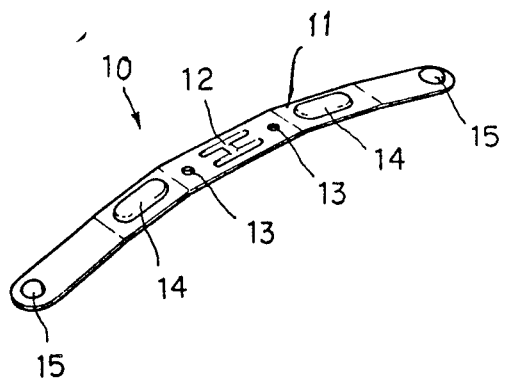
FIG. 3 is a perspective view of a leaf spring for supporting reels of a video tape cassette according to the present invention.
Figure 4:
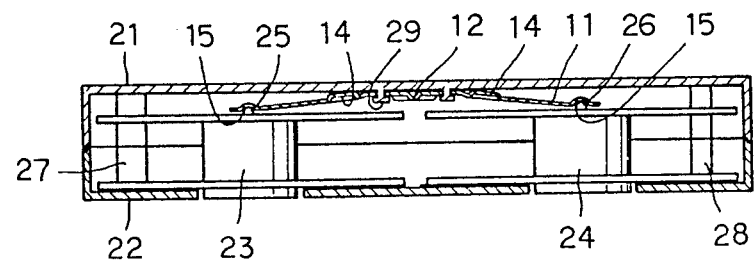
FIG. 4 is a sectional view of a video tape cassette including the leaf spring according to the present invention.

Referring now in detail to the drawings for the purpose of illustrating preferred embodiments of the present invention, a leaf spring 10 for use in a video tape cassette as shown in FIGS. 3 and 4 comprises a steel plate body having an arcuate shape with both end portions thereof slightly bent downwardly. The plate body 11 is provided with a tension supporting recess 12 disposed at the center thereof and pivoting protrusions 15 disposed at both ends thereof. On either side of the tension supporting recess 12, fixing holes 13 for fixing the plate body 11 to the lower surface of an upper housing 21 are formed. Tension retaining projections 14 are disposed between the fixing holes 13 and the pivoting protrusions 15.

The tension supporting recess 12, tension retaining protrusions 14, and pivoting protrusions 15 are formed through an embossing processing. The tension supporting recess 12 has a H-shaped configuration and the tension retaining protrusions 14 have a elliptical configuration. The pivoting protrusions 15 have a hemispherical configuration and also may be formed in a conical configuration.

In assembly, the leaf spring 10 to the tape cassette as shown in FIG. 4, the upper surface of the plate body 11 is closely attached with the lower surface of the upper housing 21 in that fixing projections 29 disposed on the lower surface of the upper housing 21 are inserted completely to the fixing holes 13 of the plate body 11, the lower ends of the fixing projections 29 are expanded by fusing, thereby the leaf spring 10 is fixed to the lower surface of the upper housing 21. The pointed upper ends, pivots 25 and 26 of the supply and take-up reels 23 and 24 disposed within the upper and lower housings 21 and 22 are located within the interiors of other pivoting protrusions 15 so as to be resiliently supported by the tensional force of the leaf spring 10.

The tape cassette including the leaf spring 10 includes guide ribs 27 and 28 which are adapted to guide the supply and take-up reels 23 and 24 (FIG. 4).

According to the leaf spring 10 for supporting reels of the present invention as described above, since the pivots 25 and 26 of the reels 23 and 24 are rotated in that they are located within and supported by the inner sides of the pivoting protrusions 15, rotational centers thereof are maintained constant without rolling so that the reels 23 and 24 do not contact with the guide ribs 27 and 28, thereby the travelling of tape becomes smooth and the picture quality becomes good.

In addition, since the leaf spring 10 of the present invention is provided with a tension supporting recess 12 at the center thereof and the tension retaining protrusions 14 at either side of the tension supporting recess 12, it is possible to provide a proper tensional force while maintaining a narrow and uniform width thereof on the whole so that the waste pieces in cutting materials are almost not produced thereby the reduction in cost and high in productivity can be achieved.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A leaf spring for use in a video tape cassette which comprises:
    a plate body having a substantially narrow and uniform width,
    a tension supporting recess disposed at the center portion of said plate body,
    a pair of tension retaining protrusions disposed on either side of said tension supporting recess, and
    a pair of pivoting protrusions disposed at both ends of said plate body and adapted to receive pivots of supply and take-up reels of the video tape cassette reels, whereby the leaf spring for supporting the supply and take-up reels prevents a tape from badly travelling and reduces waste pieces from cutting materials.

2. The leaf spring of claim 1, wherein the tension supporting recess has a H-shaped configuration and is upwardly protruded.

3. The leaf spring if claim 1, wherein the tension retaining protrusions have an elliptical configuration and are upwardly protruded.

* * * * *